United States Patent
Leelayoova et al.

(10) Patent No.: US 11,768,099 B2
(45) Date of Patent: Sep. 26, 2023

(54) CALIBRATION METHOD FOR LIQUID FLOWMETER

(71) Applicant: PVTE COMPANY LIMITED, Nonthaburi (TH)

(72) Inventors: Tanunt Leelayoova, Nonthaburi (TH); Uracha Poopakdee, Nonthaburi (TH)

(73) Assignee: PVTE COMPANY LIMITED, Nonthaburi (TH)

( * ) Notice: Subject to any disclaimer, the term of this patent is extended or adjusted under 35 U.S.C. 154(b) by 183 days.

(21) Appl. No.: 17/433,925

(22) PCT Filed: Feb. 4, 2020

(86) PCT No.: PCT/TH2020/000007
§ 371 (c)(1),
(2) Date: Aug. 25, 2021

(87) PCT Pub. No.: WO2020/209806
PCT Pub. Date: Oct. 15, 2020

(65) Prior Publication Data
US 2022/0049987 A1    Feb. 17, 2022

(30) Foreign Application Priority Data
Apr. 10, 2019   (TH) .............................. 1903000869

(51) Int. Cl.
*G01F 25/10* (2022.01)
(52) U.S. Cl.
CPC .................... *G01F 25/14* (2022.01)
(58) Field of Classification Search
CPC ........................................................ G01F 25/14
See application file for complete search history.

(56) References Cited

U.S. PATENT DOCUMENTS

| 8,307,692 B2 | 11/2012 | Fischer et al. |
| 2005/0115501 A1* | 6/2005 | Toriya .................. G05D 7/0635 |
| | | 118/715 |

(Continued)

FOREIGN PATENT DOCUMENTS

| CN | 204730917 U | 10/2015 |
| CN | 105509844 A | 4/2016 |

(Continued)

OTHER PUBLICATIONS

International Search Report dated Aug. 31. 2020 for Application No. PCT/TH2020/000007.

(Continued)

*Primary Examiner* — Herbert K Roberts
(74) *Attorney, Agent, or Firm* — Ladas & Parry LLP (57) ABSTRACT

A calibration method for a liquid flowmeter comprising: providing a first tank (12) for receiving said liquid to be measured and a liquid storage tank (14) connected to said first tank (12); providing a liquid delivering line (9) for conveying the liquid from said liquid storage tank (14) to an external device; providing a weighing sensor (22) for weighing the liquid contained in either the first tank (12) or the liquid storage tank (14), wherein during performing the calibration for the flowmeter (20): disconnecting the liquid delivering line (9) in a conveyance direction downstream of the liquid flowmeter (20) from the external device; connecting said liquid delivering line (9) in the conveyance direction downstream of said liquid flowmeter (20) to a calibrating line (7) connected to said first tank (12); and determining a flow rate of the conveyed liquid within a predetermined time interval based on the change in the liquid weight measured by said weighing sensor (22) in said predetermined time interval, wherein the liquid from said liquid storage tank (14) is delivered through the liquid delivering line back to said first tank (12), and the flow rate of the liquid (Continued)

from the liquid storage tank (14) to said first tank (12) is controlled so as to be substantially constant during calibration.

5 Claims, 4 Drawing Sheets

(56) References Cited

U.S. PATENT DOCUMENTS

2015/0355003 A1* 12/2015 Saeger ................ G01P 13/0073
73/861.18
2017/0052056 A1* 2/2017 Yamasaki ............... G01F 25/14

FOREIGN PATENT DOCUMENTS

| | | | |
|---|---|---|---|
| CN | 106197623 | A | 12/2016 |
| CN | 206945098 | U * | 1/2018 |
| CN | 108026907 | A | 5/2018 |
| CN | 208383250 | U | 1/2019 |
| JP | 2017187366 | A | 10/2017 |
| RO | 119748 | B1 * | 2/2005 |
| RO | 123231 | B1 * | 3/2011 |

OTHER PUBLICATIONS

Written Opinion dated Aug. 31, 2020 for Application No. PCT/TH2020/000007.
English abstract of TH 115985.

* cited by examiner

CALIBRATION METHOD FOR LIQUID FLOWMETER

RELATED APPLICATION

This application is an application under 35 U.S.C. 371 of International Application No. PCT/TH2020/000007 filed on Feb. 4, 2020, the entire contents of which are incorporated herein by reference.

FIELD OF THE INVENTION

The present invention relates to the field of engineering, and particularly relates to a calibration method for a liquid-flow measuring system.

BACKGROUND OF THE INVENTION

In an animal-ted manufacturing system, there is mixing of solid- and liquid-type raw materials as animal-feed ingredients, such as cassava, corn, paddy, and rice bran, with liquid raw materials as animal-feed additives used in the animal-feed manufacturing, such as water, molasses, fungicide, feed-quality preservatives, and flavors, such that the animal feed with complete nutrient content according to its formulation and suitable moisture content is obtained. It is common practice that animal-feed ingredients and various chemical agents must be weighed or measured for their proper amounts and introduced into a mixing tank before subjected to any further processing, such as agitating, grinding, heating, pelletizing, and packaging, such that a finished animal-feed product is obtained and ready for market.

For a continuous manufacturing process, the raw materials and various ingredients are conveyed continuously to the mixing tank. The solid raw materials and ingredients are weighed by weighing scales or load cells while they are conveying by conveyor belts or screw conveyors to the mixing tank. At the same time, the liquid ingredients are weighed, and/or liquid flow rates of the liquid ingredients are measured by flowmeters in order to obtain proper amounts according to the given formulation. Therefore, accuracy of the liquid flowmeters is extremely important, and the flowmeters must necessarily be calibrated so that they can always attain the accuracy.

At present, for the flowmeter calibration, the entire manufacturing process must generally be stopped in order to perform the flowmeter calibration, and then the liquid used in the process, such as water and fungicide, which its weight is certainly known, is pumped through the flowmeter to be calibrated over a certain time interval. Thereafter, a reading of the meter is acquired in order to compare with an average flow rate of the liquid calculated from the known weights and used time intervals, so that an error of said flowmeter is known, and then adjustment is performed to obtain the correct value.

A practical flowmeter calibration system, including converting a counted pulse signal acquired from the flowmeter to a weight, usually must has a signal receiver, a processor and a human-machine interface. By weighing a real weight, the pulse signal value outputted from the flowmeter is acquired, then the data is used for calculating a parameter used for comparing with the real weight of liquid flowed through the flowmeter, wherein the liquid flowed through the flowmeter must be outputted for weighing at the actual point-of-use (endpoint) due to the different liquid-flow rate in a pipe and pressure as compared with a point located near the flowmeter. If the real weights are weighed at a flowmeter-installing point and the actual point-of-use, there will be a deviation as comparing the real weights obtained from the two points, even if a display at a control system is equal from the same counts and the same used parameters. In general, if the flowmeter calibration is required to be performed at another point, which is not the point-of-use, a valve used for adjusting the liquid pressure in the pipe must be adjusted, or the flow rate in the pipe must be adjusted, so that the pressure is equal to the pressure at the point-of-use in order to obtain the correct and accurate calibration.

However said calibration method has disadvantages, namely, it takes a relatively long time for calibration preparation, because the production line may have to be stopped for a long time, and the liquid subjected to the calibration cannot be immediately utilized, therefore it can cause difficulty and waste. Furthermore, the existing calibration methods may also easily cause an error, because environmental factors of the calibration are not the same as the environmental factors during the actual operation, such as wear and tear of machines, namely, a pressure pump, pressure loss in a conveying pipe at various, heights of measuring points, and the like, such that it results in that the conventional calibration method may have an error and lack of efficiency.

Thai patent application number 0801005493, published as Patent Application Publication number 115985 on Aug. 31, 2012, discloses a calibration system for a fuel-conveying system in a fuel manufacturing process, namely, an injection system of a fuel catalyst or a fuel additive, etc., the fuel contained in a tank is weighed by at least one load cells. The calibration is performed by delivering the fuel of a directly- or indirectly-known weight to the load cells, and measuring the delivered-fuel weight. Then a comparison of the measured weight acquired from the load cells and the known weight is conducted in order to calculate a deviation between the two weights, so that the measurement is adjusted therefrom.

U.S. Pat. No. 8,307,692 B2, entitled "Calibration of Dust Load Flow Measuring Systems", issued on Nov. 13, 2012 by Siemens Aktiengesellschaftt, Germany, shows a method for calibrating a dust load flow measuring system, wherein the pulverized fuel dust is pneumatically driven. In said method, the pressure between a receiving container and a metering container is controlled to be a constant value of the actual-operating pressure throughout the calibration by opening/closing control of a pressure control valve. However, said method cannot be applied to a liquid-flowmeter calibration, wherein the liquid is driven by a pressure pump or gravity feed.

US patent application publication number US 2017/0052056 A1, entitled "Method and Apparatus for Testing Liquid Flowmeter", by Azbil Corporation, Japan, discloses a liquid-flowmeter calibration, wherein the liquid is pumped through the flowmeter into a weighing tank weighed by load cells, while the temperature and pressure of the liquid flowed through the flowmeter are being measured throughout the calibration, and then an instrumental error of the flowmeter is calculated based on the measured values. However, the method according to said application does not take actual-operating environment into consideration, such as heights of weighing points for the calibration, a height and a length of a pipe, and wear and tear of a liquid conveying pump, which may result in that the liquid flow is not equal to the flow during actual operation, even though the pump is operated at the same rotational speed. Furthermore, it does not appear that whether the liquid subjected to the calibration can be reused or not.

SUMMARY OF THE INVENTION

To solve the foregoing problems, an object of the present invention is to provide a calibration method for a liquid flowmeter, wherein it is accurate, it can be performed quickly in a semi-automatic or automatic manner, it can also achieve cost saving in the calibration without waste by means of reusing the liquid subjected to the calibration, and it can also achieve time reducing in stopping of a production line, such that it can reduce both time and raw material losses in the production, therefore, the production cost can be reduced.

The calibration method for the liquid flowmeter according to this invention comprises: providing a first tank for receiving said liquid to be measured and a liquid storage tank connected to said first tank; providing a liquid delivering line for conveying the liquid from said liquid storage tank to an external device; providing a weighing sensor for weighing the liquid contained in either the first tank or the liquid storage tank, wherein during performing the calibration for the flowmeter: the liquid delivering line is disconnected in a conveyance direction downstream of the liquid flowmeter from the external device; said liquid delivering line is connected in the conveyance direction downstream of said liquid flowmeter to a calibrating line connected to said first tank; and a flow rate of the conveyed liquid within a certain time interval is determined by using change in the liquid weight measured by said weighing sensor in said time interval, wherein the liquid from said liquid storage tank is delivered through the liquid delivering line back to said first tank, and the flow rate of the liquid from the liquid storage tank to said first tank is controlled to be a substantially constant value.

In view of the method for delivering the liquid from said liquid storage tank through the liquid delivering line back to said first tank, when the calibration is completed, the liquid subjected to the calibration can immediately be reused without any waste, so that it can reduce a stopping time of the production line, and it can also reduce both time and raw material losses in the production. Therefore, the production cost can be reduced.

In one embodiment of this invention, the calibration method for the liquid flowmeter may include controlling the flow rate of the liquid from the liquid storage tank to said first tank to be constant during said calibration by a feedback control method with a signal from the flowmeter. In view of said method, the environment can be controlled during the calibration to be similar to the actual-operating environment. Therefore, the calibration is accurate and can reduce an error.

Furthermore, during performing the flowmeter calibration, the disconnecting of the liquid delivering line from the external device and the connecting of said liquid delivering line to said calibrating line are conducted by two 2-way valves or a 3-way valve controlled either manually, or electrically, or pneumatically. Therefore, the calibration can be performed automatically or semi-automatically.

Furthermore, the calibration method may be a single-point calibration or a multi-point calibration.

The method according to this invention can be applied to an animal-feed manufacturing apparatus, so that the animal feed with proper liquid raw materials according to the formulation and given physical properties is obtained.

In another embodiment of this invention, the liquid used in the calibration ma be flowed from the first tank to the liquid storage tank by either gravity feed or a driving force from a pump installed interposedly in a flowing line between the first tank and the liquid storage tank. Such additional pump installation can lead to increase a flow speed of the liquid flowed between the first tank and the liquid storage tank. Therefore, a time interval that the production process needed to be stopped can be reduced.

Furthermore, the now rate of the liquid flowed through the flowmeter in the calibration is adjusted to be the actual-operating flow rate.

In another embodiment of the calibration method according to this invention, a setpoint used for adjusting of said liquid flow rate to be constant is calculated from an average of the actual-operating flow rates before performing the calibration. Therefore, a calibration error due to wear and tear of machines used in the process can be reduced.

DETAILED DESCRIPTION

The description provides explanation of the invention by exemplifying this invention and refers to the accompanying drawings in order to be examples and help describing them more dearly, in which similar reference numerals refer to similar elements in these drawings. However, it is not intended to limit this invention by this description, and the scope of this invention is defined by the attached claims.

Figure 1:
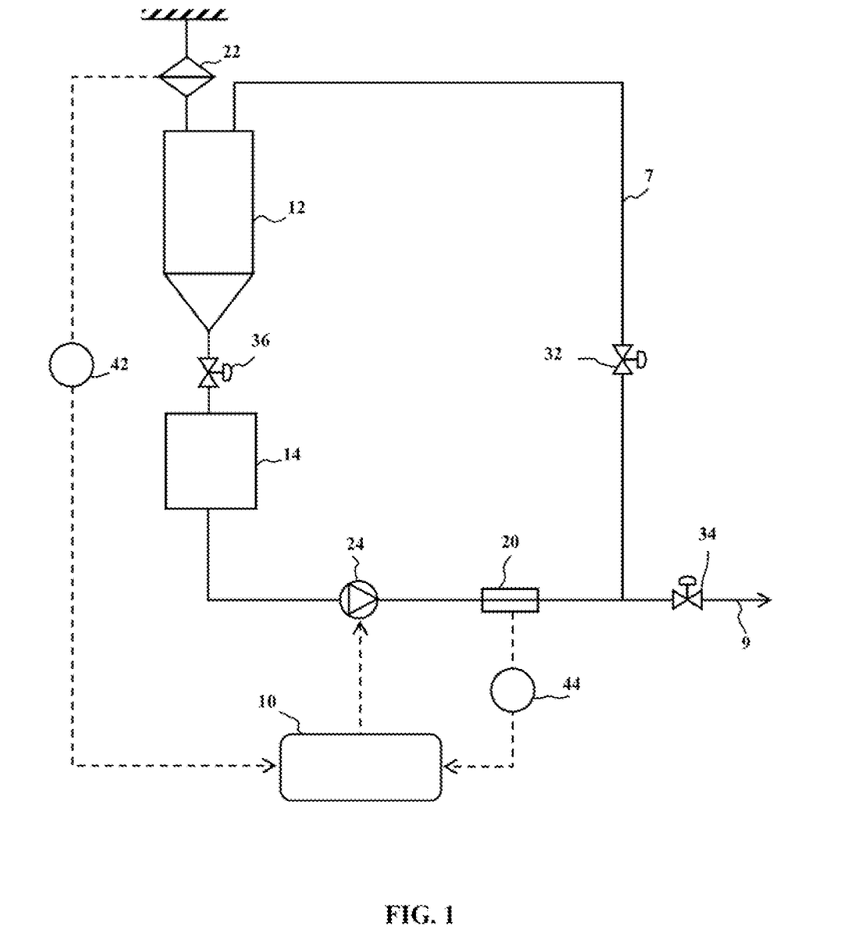
FIG. 1 illustrates a first embodiment of an apparatus for a calibration process for a liquid flowmeter of a method according to this invention.

FIG. 1 illustrates a first embodiment of an apparatus for performing a calibration method for a liquid flowmeter of a method according to this invention.

The apparatus consists of a first tank 12 used for receiving a liquid to be calibrated, such as fungicide, water, and feed-quality preservatives, a liquid storage tank 14 fluidly connected to the first tank 12 via a valve 36, which may be a manual controlled valve or a pneumatic or electrical opening/closing-controlled valve. The liquid outputted from the liquid storage tank 14 is flowed through a liquid delivering line 9 in order to convey the liquid from said liquid storage tank 14 to an external device, such as a conveying device, and an animal-feed mixing tank.

In a normal operation, the liquid is driven by an electric, motor and pump 24 in order to obtain the pressurized liquid, wherein, preferably, a rotational speed of the electric motor is controlled by an inverter or the like. The liquid flowed through the pump 24 is flowed through a liquid flowmeter 20 used for measuring a flow rate of the liquid flowed through the liquid delivering line 9, and then it is flowed through a valve 34 but it is blocked such that the liquid cannot be flowed through a valve 32. The valves 32 and 34 may be two 2-way valves or only one 3-way valve, wherein these valves are manually controlled, or electrically controlled, or pneumatically controlled.

According to FIG. 1, a line branched from the liquid delivering line 9 is provide at a point located downstream of the liquid flowmeter 20. Said branched line serves as a calibrating line 7, while the other end of the calibrating line 7 is fluidly connected to the first tank 12.

In the normal operation, the calibrating line 7 is blocked by the valve 32 in order to prevent the liquid from flowing into the calibrating line 7.

The flowmeter 20 may be a displacement flowmeter or the like. The flowmeter 20 outputs an electrical signal as a pulse, and such pulse signal is sent to a signal converter 44 in order to convert the pulse signal to a standard electrical signal. The electrical signal outputted from the signal converter 44 is directly proportional to a measured liquid-flow rate. Then the signal outputted from the signal converter 44 is sent to a controlling means 10 in order to be used in an operation control and display the flow rate to inform an operator.

The flowmeter 20 must be calibrated in order to always output an accurate measured value, otherwise it will cause an error in the manufacturing process and may not achieve a desired quality of the product.

The controlling means 10 may, for example, be a PID microcontroller or the like (for example P controller with gain (k constant)=1) having an internal memory unit for storing data and programs necessary for the operation, can receive electrical signals from external sensors, and can output electrical signals in order to control devices connected to the controlling means 10 via input/output ports in order to operate according to a desired written program. The controlling means 10 performs the operation control of all devices, and may also include a display and a keyboard or a key pad (not shown) or a device for receiving input entered from a user.

Furthermore, the apparatus also consists of at least one weighing sensor or device (load cells) 22, which can be installed in many different forms. In the first embodiment as shown in FIG. 1, the weight scale type of the load cells 22 is installed in a manner of hanging from a ceiling in order to weigh the first tank 12, while the load cells 22 is installed in order to weigh the liquid storage tank 14 in the second embodiment shown in FIG. 2 as further described in detail hereafter.

In the first form, the first tank 12 is installed at a level higher than the liquid storage tank, such that the liquid can be flowed back into the liquid storage tank 14 by gravity feed. In this embodiment, the load cells are installed above the first tank 12 in order to serve as a weight reader for the liquid contained in the first tank 12.

The signal outputted from the load cells 22 is sent to a signal converter 42, wherein the signal is converted to electrical analog signal (such as signal 0-10 Vdc or 4-20 mA) corresponding to a measured weight acquired from the load cells 22. The electrical signal outputted from the signal converter 42 is directly proportional to the weight of the liquid contained in the measured tank. Then the signal outputted from the signal converter 42 is sent to the controlling means 10 in order to be used for further processing.

During performing the calibration of the flowmeter 20, the controlling means is configured such that the liquid delivering line 9 is disconnected in a conveyance direction downstream of the liquid flowmeter 20 from the external device, and, at the same time, said liquid delivering line 9 is connected in the conveyance direction downstream of said liquid flowmeter 20 to the calibrating line 7 connected to said first tank 12, so that the liquid from the liquid storage tank 14 is pumped by the pump 24 through the flowmeter 20 via the valve 32 to the first tank 12.

According to the first embodiment of this invention, the valve 36 is closed in order to block the liquid from the first tank 12 from flowing to the liquid storage tank 14. Then the controlling means 10 starts storing the weight and time data of the first tank 12 and the liquid contained therein together with the pulse signal data from the flowmeter 20 in relation to time, which is continuously increased, because the liquid is pumped back through the calibrating line 7, and stops storing the weight and time data when the calibration is completed.

Then the flow rate of the conveyed liquid within a certain time interval is determined by using change in the liquid weight measured by said weighing sensor 22 in said time interval, wherein the liquid from said liquid storage tank 14 is delivered through the liquid delivering line back to said first tank 12, and the flow rate of the liquid flowed from the liquid storage tank 14 to said first tank 12 is controlled to be a substantially constant value, for example, by an inverter (not shown), such that its condition is close to the actual-operating condition as much as possible.

Figure 2:
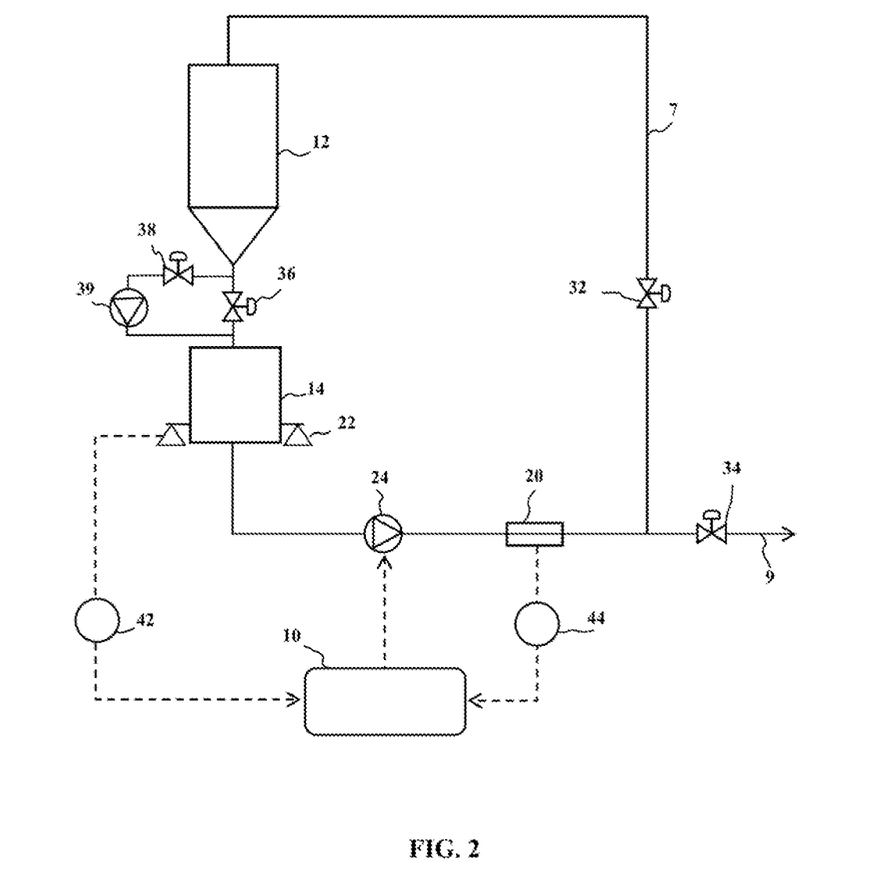
FIG. 2 illustrates a second embodiment of an apparatus for a calibration process for the liquid flowmeter of a method according to this invention.

FIG. 2 illustrates a second embodiment of an apparatus for a calibration process for the liquid flowmeter of a method according to this invention.

According to FIG. 2, the configuration is similar to that of the embodiment as shown in FIG. 1, except that load cells 22 is installed in order to weigh a liquid storage tank 14 served as a reservoir bin, wherein the weight is included the weight of the liquid contained in the liquid storage tank 14. The second embodiment is suited for the calibration of the flowmeter 20 by measuring the reduction of the weight of the liquid contained in the liquid storage tank 14. In this embodiment, a pump 39 may be used for pumping the liquid from a first tank 12 back to the liquid storage tank 14 or may let the liquid flowed back through a valve 36 by the gravitational force. In this embodiment, the load cells 22 is installed underneath the liquid storage tank 14 for reading the loss weight during performing the calibration.

During the calibration according to the second embodiment, a controlling means 10 starts storing the weight data of the liquid storage tank 14 and the liquid contained therein, which is continuously decreased, because the liquid contained in the liquid storage tank 14 is pump out, together with the pulse signal data from the flowmeter 20 in relation to time, and stops storing the weight data acquired from the load cells, when the calibration is completed, so that it is used for determining the change in the weight during the calibration.

Furthermore, in the second embodiment, it further consists of a pump 39 installed interposedly in a flowing line between the first tank 12 and the liquid storage tank 14 for filling the liquid into the liquid storage tank 14 up to a predetermined weight rapidly before starting the calibration. In view of the liquid is flowed from the first tank 12 to the liquid storage tank 14 by the pump 39 instead of the gravity feed, the calibration time interval can be reduced.

According to the second embodiment, other elements are similar to those of the first embodiment as shown in FIG. 1, and the similar reference numerals are used, therefore, it is not necessary to repeatedly explain it here.

Alter the calibration is completed, when the liquid flowmeter 20 is properly calibrated so that its accuracy can be achieved therefrom, the controlling means will open the valve 34 and close the valve 32 in order to be able to further perform according to the manufacturing process.

Figure 3:
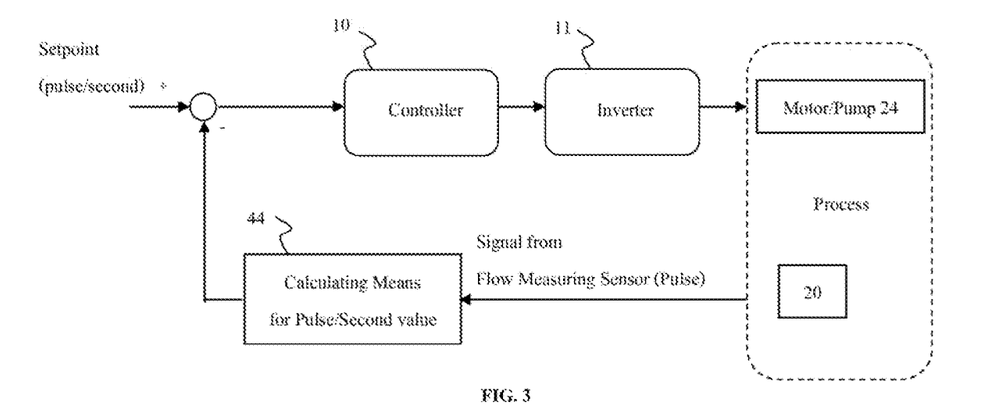
FIG. 3 is a block diagram of a control system for controlling a liquid flow rate to be constant by a feedback control method.

FIG. 3 is a block diagram of a control system for controlling the liquid flow rate to be constant by a feedback control method.

According to FIG. 3, an inverter 11 is a device for driving a motor/pump 24 in order to control flow rate of the pump 24 by varying motor input frequency of the motor and pump 24 in the process to be a predetermined setpoint (pulse/minute or pulse/second) at all time such that the flow rate of the liquid at a calibration point is equal to that at an endpoint, which is connected to the external device. If the endpoint is located far and below the calibration point, the inverter will decrease the flow rate of the pump 24, such that the liquid flowed out of the calibration point is decreased. But if the endpoint is located far and above the calibration point, the inverter will increase the flow rate of the pump 24, such that the liquid flowed out of the calibration point is increased. The pulse signal acquired from the flow-measuring sensor (flowmeter) 20 in the process is converted to the flow rate in a unit of pulse/minute (or pulse/second depending on the flowmeter specification), wherein one pulse is directly proportional to the instantaneous speed and volume of the liquid flowed through the flow-measuring sensor. The pulse/minute (or pulse/second) signal is sent as a feedback signal to the controller 10 in order to instruct the inverter to increase or decrease the output value of the inverter which is a rotational speed control instruction of the electric motor/pump 24, so that the liquid flowed through the pump 24 from the liquid storage tank 14 to the first tank 12 during the calibration is controlled to be a substantially constant flow rate. As explained above, it results that the measurement error is significantly reduced.

Figure 4:
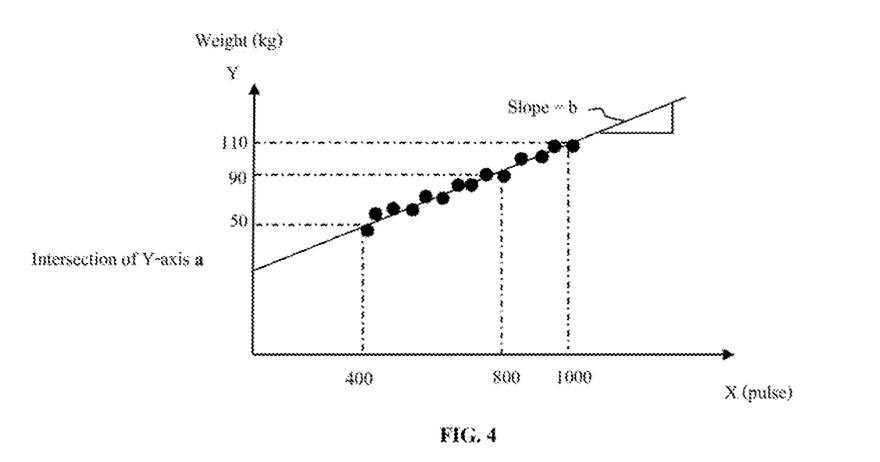
FIG. 4 illustrates an example of data resulted from a multi-point calibration.
Figure 5:
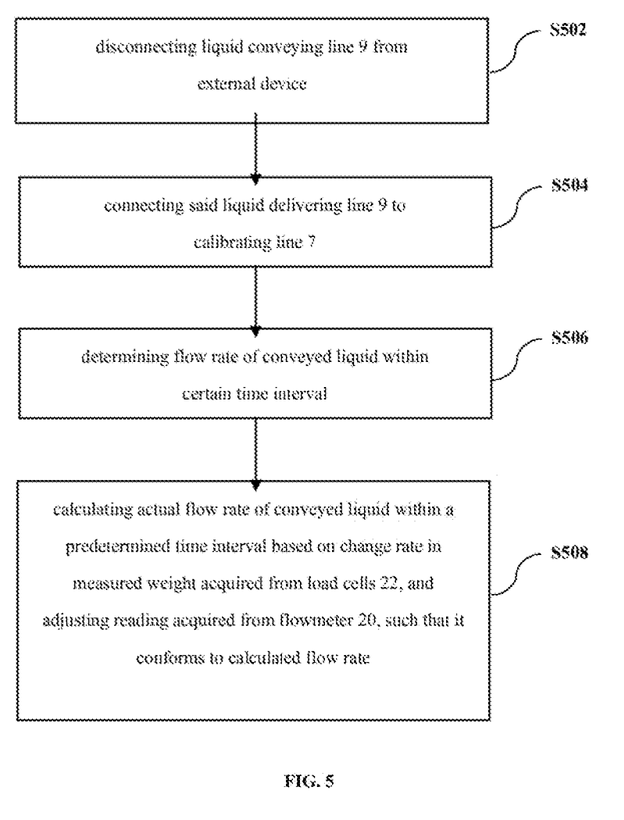
FIG. 5 illustrates a workflow of the method according to this invention.

Next, calibration steps of the calibration method according to this invention is described referring to FIG. 4 and FIG. 5.

Next, the calibration method according to this invention is explained referring to FIG. 5.

According to FIG. 5, when the calibration is started, after the liquid delivering line 9 is disconnected in a conveyance direction downstream of the liquid flowmeter 20 from the external device, and said liquid delivering line 9 is connected in the conveyance direction downstream of said liquid flowmeter 20 to a calibrating line 7 connected to the first tank 12 according to steps S502 and S504, respectively, the controller then determines an actual flow rate of the conveyed liquid within a certain time interval, namely, from a calibration starting point to a given point (target setpoint, in order to stop performing the calibration, wherein the data are stored intermittently as given in the memory of the controller 10 (step S506), and in step S508, the controller calculates the actual flow rate of the conveyed liquid within this certain time interval from the change rate in the measured weight acquired from the load cells 22, and the reading from the flowmeter 20 is adjusted, such that it conforms to the calculated actual flow rate as will be further explained in detail later.

The controller preferably uses machine learning data obtained from the actual operation for automatically controlling the inverter in the calibration and adjusting the flow rate of the motor/pump 24 to be increased in order to compensate a reduced flow rate in the case of an efficiency deterioration of the pump according to an example as will be further explained in detail later.

In actual operation, the flow rate is controlled by the controller 10 via the operation of the inverter 11 for operating the pump 24 to be in a range of 50-90% of the operational efficiency of the pump 24, and the flow rate data are stored in the memory, wherein the flow rate is stored in the unit of pulse per second or hertz.

For the calibration, the controller 10 controls the valve 32 to be opened for filling the liquid back for using in the calibration. The speed of the liquid flowed in the pipe may not equal to that at the endpoint. The inverter 11 controls the flow rate of the liquid flowed through the pump to be equal to the flow rate at the endpoint using the feedback control with the signal from the flowmeter, wherein the signal may be an analog signal (4-20 mA, 0-10 Vac), or a signal obtained from a pulse train output, or a signal obtained from a serial bus communication system, such as RS232, RS415, and CAN Bus, or the like, such that the flow rate of the liquid flowed through the pump is equal to that at the endpoint during the actual operation.

Table 1 shows an example of results of a weighing test,

TABLE 1

| Weighing Point | Height (m) | Pulse Rate (Hz)(1) | Inverter Output (%)(2) | Measured Weight (kg)(3) | Actual Weight (kg)(4) | Note |
|---|---|---|---|---|---|---|
| 1 | (+1) | 100 | 80 | 25.00 | 22.50 | The calibration point is located near the flowmeter. |
| 2 | (+20) | 83 | 80 | 25.00 | 25.00 | The actual point-of-use has the height and length of the pipe as the factors. |
| 3 | (−10) | 110 | 80 | 25.00 | 21.30 | The actual point-of-use has the height less than that of the flowmeter. |
| 1 | (+1) | 83 | 74 | 25.00 | 25.00 | The inverter is adjusted according to learning use obtained from the machine learning. |
| 2 | (+20) | 83 | 80 | 25.00 | 25.00 | The machine learns from the actual flow rate. |
| 3 | (−10) | 83 | 68 | 25.00 | 25.00 | The inverter is adjusted according to learning use obtained from the machine learning. |

TABLE 1-continued

| Weighing Point | Height (m) | Pulse Rate (Hz)(1) | Inverter Output (%)(2) | Measured Weight (kg)(3) | Actual Weight (kg)(4) | Note |
|---|---|---|---|---|---|---|
| 2 | (+20) | 83 | 85 | 25.00 | 25.00 | The inverter increases the rotational speed of the motor in the case of the reduced flow rate. | wherein
(1) the count rate acquired from the flowmeter 20 (pulse/second or hertz),
(2) the duty cycle outputs of the inverter 11 calculated in %,
(3) the weight shown on the controller (kg),
(4) the actual measured weight obtained by weighing the liquid using the external scale, and
(5) the machine learns from calculating an average of the actual operation in the last 1-10 times (calculates the average) in order to be set as the setpoint for using in adjusting the flow rate of the liquid flowed through the pump to be constant.

Next, the single-point calibration and the multi-point calibration performed at the point located near the flowmeter installation point using the inverter 11 for controlling the flow are explained.

The single-point calibration is a calibration using only single pulse value as a given setpoint. As an example shown below, the pulse target is set to be 400 pulses, and then the actual weight is weighed to be 50 kg, and the calibration is stopped when the measured pulses acquired from the flowmeter is equal to the pulse target, wherein the flow rate is controlled to be constant throughout the calibration, and the flow rate of the liquid flowed through the flowmeter 20 is adjusted to be equal to the flow rate during the actual operation.

Y=measured weight acquired from load cells X=number of counted pulses acquired from flowmeter m=parameter value

| Calibration Point | Pulse (X) | Weight in kg (Y) |
|---|---|---|
| 1 | 400 | 50 |

Formula Y = mX; (1)
m = 0.125

Then the measured data are used for calculating in used in setting values in the controller in order to be used in a further process. An advantage of the single-point calibration is that it can be done in a short time.

Next, the multi-point calibration is described. The multi-point calibration is a calibration using multiple pulse values as the target setpoints. As shown in FIG. 4, for example, the pulse targets are set to be 400, 800, and 1,000 pulses, and then the actual weights are weighed to be 50, 90, and 110 kg, respectively. Then these data are used for calculating parameters in order to find a linear relation according to an equation (2):

$$Y = a + bX, \quad (2)$$

where Y is the measured weight acquired from the load cells, X is the number of the counted pulses acquired from the flowmeter, a is a value of y of the point of intersection with Y-axis, and b is a slope, as approximated from the data.

The a and b can be calculated from following equations:

$$a = \frac{(\sum y)(\sum x^2) - (\sum x)(\sum xy)}{n(\sum x^2) - (\sum x)^2}; \quad (3)$$

and $$b = \frac{n(\sum xy) - (\sum x)(\sum y)}{n(\sum x^2) - (\sum x)^2}, \quad (4)$$

where Yi is the measured weight acquired from the load cells 22 at the $i^{th}$ value, and Xi the number of the counted pulses acquired from the flowmeter at the $i^{th}$ value, wherein i is a counting number that is equal to or more than 1.

Table 2 is an example of data obtained from the 3-point calibration for the flowmeter.

| Calibration Point | Pulse (X) | Weight in kg (Y) | xy | $x^2$ | $y^2$ |
|---|---|---|---|---|---|
| 1 | 400 | 50 | 20000 | 160000 | 2500 |
| 2 | 800 | 90 | 72000 | 640000 | 8100 |
| 3 | 1000 | 110 | 110000 | 1000000 | 12100 |
| Σ | 2200 | 250 | 202000 | 1800000 | 22700 |

$\Sigma x = 2200$, $\Sigma y = 250$, $\Sigma xy = 202000$, $\Sigma x^2 = 1800000$, $\Sigma y^2 = 22700$, n = number of data sets = 3
a = 10
b = 0.1

The values of the calculated a and b are used for adjusting parameters in the controller in order to be used for controlling in a further process.

As described above, it shows that this invention relates to the calibration method for various flowmeters, such as a displacement flowmeter. In the prior art, the calibration method must be performed by testing, wherein a liquid is flowed through an actual flowmeter, and then the weight of the liquid flowed out of the flowmeter is weighed in order to calculate values of parameters used in a control system, which can be divided into two main sections, namely, (1) a signal receiving and processing unit comprising a readymade meter and an embedded chip programmable logic control unit, and (2) a human-machine interface. The readymade meter may have press-buttons or accessory displays for users, such as a readymade screen with controlling via control buttons a readymade screen with controlling via a touch screen or a computer having an auxiliary program.

For the method according to this invention, the liquid weighing process can be easily performed, and at the same time, the novel calibration method can rapidly calculate the parameter values, has no waste of the liquid subjected to the calibration, and has no time loss relating to the time for refilling the tested liquid back into the tank.

For the proposed method according to this invention, the calibration can be performed in the region located near the flowmeter installation position using the inverter for properly controlling the liquid flow rate, and at the same time, the weighing system can be installed on the upper side of the device itself (the first form), or can use the loss-in-weight principle (the second form) having the valve control system for controlling the flow of the liquid back to be weighed at the upper part. The purpose of this invention is that the single-point and multi-point calibration can easily be performed, wherein it can be performed in the region within 5 m from the flowmeter, even though the actual point-of-use is much farther apart therefrom.

For the method according to this invention, the apparatus can perform both of the manual flowmeter calibration, wherein the flow rate is adjusted by the operator of the inverter, and automatic flowmeter calibration, wherein the machine learning obtained from the actual operation is used for the automatic control of the inverter using retro-statistical data obtained from the actual operation of the motor and pump as the setpoint of the inverter.

Furthermore, for the method according to this invention, the liquid subjected to the calibration can be reused immediately without discarding the liquid waste or refilled, to the tank by pumping or forcing down, whereas in the prior art, the weighed liquid must be discarded or must be refilled to the tank later. Therefore, coming in contact with the liquid, which can be hazardous substance, can be reduced, it can promote the safety to workers.

Although the present invention has been described in details in connection with the accompanying drawings as embodiments of the invention, it must be understood that various modifications or alternations may be made by a person having ordinary skill in the art without departing from the scope and concept of the invention. The scope of the present invention conforms with the features of this invention as defined by the attached claims. It also includes other features structures or elements of the invention that even though not specified particularly in the claims, but they are considered to be useful and provide the same results as the features of this invention specified in the claims.

We claim:
1. A calibration method for a liquid flowmeter comprising the steps of:
   providing a first tank (12) for receiving said liquid to be measured and a liquid storage tank (14) connected to said first tank (12);
   providing a liquid delivering line (9) for conveying the liquid from said liquid storage tank (14) to an external device;
   providing a weighing sensor (22) for weighing the liquid contained in either the first tank (12) or the liquid storage tank (14),
   during performing the calibration for the flowmeter (20):
      disconnecting the liquid delivering line (9) in a conveyance direction downstream of the liquid flowmeter (20) from the external device;
      connecting said liquid delivering line (9) in the conveyance direction downstream of said liquid flowmeter (20) to a calibrating line (7) connected to said first tank (12) so that the liquid from said liquid storage tank (14) is delivered through the liquid delivering line (9) so as to pass through the flowmeter (20) back to said first tank (12); and
      determining an estimated flow rate of the conveyed liquid by calculating the change in weight of the conveyed liquid measured by said weighing sensor (22) during a predetermined time interval,
      the method being characterized in that, during performing the calibration, the flow rate of the liquid from said liquid storage tank (14) to said first tank (12) passing through the flowmeter (20), is controlled by a controller so as to be substantially constant and substantially equal to the flow rate during the actual operation, throughout the calibration using a feedback signal from the flowmeter (20) and in that the reading from the flowmeter is adjusted so that it is in conformity with said estimated flow rate.

2. The method according to claim 1, wherein, during the calibration for the flowmeter, disconnecting of the liquid delivering line (9) from the external device and connecting of said liquid delivering line (9) to said calibrating line (7) are conducted by two 2-way valves (32, 34) or a 3-way valve which is controlled either manually, electrically, or pneumatically.

3. The method according claim 1, wherein said calibration method is a single-point calibration or a multi-point calibration.

4. The method according to claim 1, wherein the liquid flows from the first tank (12) to the liquid storage tank (14) by either gravity feed or a driving force from a pump (39) installed interposedly in a flowing line between the first tank (12) and the liquid storage tank (14).

5. The method according to claim 1, wherein a setpoint used for controlling said liquid flow rate so as to be substantially constant is calculated from an average of the actual-operating flow rates within a specific period of time before performing the calibration.

* * * * *